US011039626B2

(12) United States Patent
Sibakov et al.

(10) Patent No.: US 11,039,626 B2
(45) Date of Patent: Jun. 22, 2021

(54) MILK PRODUCT AND PREPARATION METHOD

(75) Inventors: Timo Sibakov, Helsinki (FI); Olli Tossavainen, Espoo (FI)

(73) Assignee: VALIO LTD., Helsinki (FI)

(*) Notice: Subject to any disclaimer, the term of this patent is extended or adjusted under 35 U.S.C. 154(b) by 0 days.

(21) Appl. No.: 13/880,453

(22) PCT Filed: Oct. 26, 2011

(86) PCT No.: PCT/FI2011/050934
§ 371 (c)(1),
(2), (4) Date: May 16, 2013

(87) PCT Pub. No.: WO2012/056106
PCT Pub. Date: May 3, 2012

(65) Prior Publication Data
US 2013/0230623 A1  Sep. 5, 2013

(30) Foreign Application Priority Data
Oct. 29, 2010 (FI) ..................... 20106137

(51) Int. Cl.
*A23C 9/12* (2006.01)
*A23C 9/142* (2006.01)

(52) U.S. Cl.
CPC .......... *A23C 9/1206* (2013.01); *A23C 9/1209* (2013.01); *A23C 9/1422* (2013.01); *A23C 9/1425* (2013.01); *C12Y 302/01023* (2013.01); *C12Y 304/00* (2013.01)

(58) Field of Classification Search
CPC ... A23C 9/1206; A23C 9/1422; A23C 21/023; A23C 9/1425; A23C 9/14; C12N 9/2471; A23L 1/296; Y10S 530/832; C12Q 1/37; C12P 21/06; A23J 3/343; A23J 3/34; A61K 35/20
USPC .............................. 426/580, 42, 491, 34, 56
See application file for complete search history.

(56) References Cited
U.S. PATENT DOCUMENTS

| | | | |
|---|---|---|---|
| 6,171,621 B1 | 1/2001 | Braun et al. | |
| 6,365,218 B1* | 4/2002 | Borschel ................ | A23L 33/40 426/573 |
| 6,787,168 B1* | 9/2004 | Sawhill .................... | 426/41 |
| 7,829,130 B2* | 11/2010 | Tossavainen et al. ..... | 426/580 |
| 2002/0192333 A1* | 12/2002 | Christensen et al. ..... | 426/42 |
| 2005/0170044 A1 | 8/2005 | Lange | |
| 2005/0214409 A1 | 9/2005 | Tossavainen et al. | |
| 2006/0286252 A1 | 12/2006 | Rangavajla et al. | |
| 2009/0092731 A1 | 4/2009 | Holst et al. | |
| 2009/0123602 A1 | 5/2009 | Yan et al. | |
| 2010/0055286 A1 | 3/2010 | Tikanmaki | |

FOREIGN PATENT DOCUMENTS

| | | |
|---|---|---|
| CN | 101 185 475 | 5/2008 |
| EP | 0 226 035 | 6/1987 |
| JP | 2002-000291 | 10/2002 |
| RU | 2 193 327 | 11/2002 |
| WO | WO 87/03786 | 7/1987 |
| WO | WO 99/65326 | 12/1999 |
| WO | WO 01/41581 | 6/2001 |
| WO | WO 03/094623 | 11/2003 |
| WO | 2009/000972 A1 | 12/2008 |
| WO | WO 2009/043356 | 4/2009 |
| WO | 2010/023362 A2 | 3/2010 |

OTHER PUBLICATIONS

International Search Report for PCT/FI2011/050934, dated Jan. 26, 2012.
International Preliminary Report on Patentability for PCT/FI2011/050934, dated Feb. 27, 2013.
Search Report for FI 20106137, dated Jun. 15, 2011.
Database WPI Week 200311, XP002666274 & RU 2 193 327, Nov. 27, 2002, 1 pg.
Hughes et al., "Protein Degradation in the Large Intestine: Relevance to Colorectal Cancer", *Curr. Issues Intest. Microbiol*, 1(2), 2000, pp. 51-58.
Matsubara et al., "Crystalline Bacterial Proteinase", *The Journal of Biochemistry*, vol. 45, No. 4, 1958, 9 pgs.
Russian Office Action in Application No. 2013124801 dated Oct. 12, 2015 with English translation.
Office Action in European Patent Application No. 11 785 712.8 dated Sep. 22, 2105.
Rutherfurd, S., Methodology for Determining Degree of Hydrolysis of Proteins in Hydrolysates: A Review, Jour. Of AOAC Intl. vol. 93., No. 5, pp. 1515-1522 (2010).
Silva et al., Comparing the hydrolysis degree of industrialization byproducts of Withemouth croaker (*Micropogonias furnieri*) using microbial enzymes, Intl. Food Res. Jour. 21(5):1757-1761 (2014).
Bu et al., "Milk processing as a tool to reduce cow's milk allergenicity: a mini-review," *Dairy Sci. & Technol.*, vol. 93: pp. 211-223 2013.
Knights, "Processing and Evaluation of the Antigenicity of Protein Hydrolysates," *Nutrition for Special Needs in Infancy: Protein Hydrolysates*, ed. Fima Lifshitz, pp. 105-115 (1985).
Turpeinen et al., Mild protein hydrolysation of lactose-free milk further reduces milk-related gastrointestinal symptoms, Journal of Dairy Research, 83(2):256-60, May 2016, Abstract available at http://www.ncbi.nlm.nih.gov/pubmed/27034058.
Notice of Opposition filed in EP Pat. No. 2 632 277 dated Dec. 21, 2018.

(Continued)

*Primary Examiner* — Hamid R Badr
(74) *Attorney, Agent, or Firm* — Nixon & Vanderhye P.C.

(57) ABSTRACT

The invention relates to a low lactose milk product where the milk protein is hydrolyzed by a protease without negatively affecting the organoleptic properties and appearance of the milk product. The invention also relates to a process for preparing a protein hydrolyzed milk product with a low lactose content.

29 Claims, 3 Drawing Sheets

(56) References Cited

OTHER PUBLICATIONS

"Lactose content of milk and milk products" *The American Journal of Clinical Nutrition*, Chapter 3, 1988, vol. 48, pp. 1099-1104.

"Nutrient Content of Milk Varieties," *Milk facts*, 12 pages, accessed Dec. 17, 2018, <http://www.milkfacts.info>.

Davisco Foods International, Inc.—Whey Protein Products, Davisco, 2007, XP002511773, URL:http://daviscofoods.com/HWP.

DTU Fødevareinstituttet "Letmrelk, konventionel (ikke økologisk)" Milk, partly skimmed, konventonal (non organic), 1.5% fat, accessed Dec. 20, 2018.

Hagihara B. et al, , "Crystalline Bacterial Proteinase", *The Journal of Biochemistry*, vol. 45, No. 3, 1958, pp. 185-195.

Jones, "Density of Milk" *The Physics Factbook*, 2 pages, 2002, <https://hypertextbook.com/facts/2002/AliciaNoelleJones.shtml>.

Nielsen, "Improved Method for Determining Food Protein Degree of Hydrolysis" *Food Chemistry and Toxilogy*, vol. 66, No. 5: 642-646 (2001).

Sejr, "Enzymes and food proteins" *Food Technology International*, Europe, 1988, pp. 245-250.

Walstra et al., *Dairy Chemistry and Physics*, 1984, p. 416.

Walstra et al., *Dairy Chemistry and Physics*, 1984, p. 457.

Wikipedia—The Free Encyclopedia "Lowry protein assay," accessed Dec. 20, 2018.

\* cited by examiner

US 11,039,626 B2

MILK PRODUCT AND PREPARATION METHOD

This application is the U.S. national phase of International Application No. PCT/FI2011/050934 filed 26 Oct. 2011 which designated the U.S. and claims priority to FI Patent Application No. 20106137 filed 29 Oct. 2010, the entire contents of each of which are hereby incorporated by reference.

FIELD OF THE INVENTION

The invention relates to a milk product that is suitable for persons suffering from lactose intolerance and/or adverse effects of milk protein. More particularly, the invention relates to a low lactose milk product where the milk protein is hydrolyzed by a protease without negatively affecting the organoleptic properties of the milk product. The invention also relates to a process for preparing a protein hydrolyzed milk product with a low lactose content.

BACKGROUND OF THE INVENTION

Milk's favourable intricate influences on mammals' health is widely recognized and established. For example, a strong reverse correlation has been observed between regular and high consumption of milk products and the development of metabolic syndrome in overweight adults. Also, milk is an outstanding source of calcium which can contribute to proper bone formation during youth. Milk is not consumed only for its valuable nutritional composition but milk has established itself as a beverage commonly consumed at daily meals, especially among children. However, there are increasing amount of people who suffer from gastrointestinal problems when consuming milk products. Problems can be derived from two main causes, i.e. lactose intolerance and adverse effects of milk protein (divided into immune-mediated hypersensitivity=milk allergy, and non-immune mediated intolerance=milk protein intolerance). Intolerance is caused by insufficient cleavage of a substrate such as lactose by lactase enzyme in intestines and is typically increased along with aging whereas milk allergy is caused by adverse immune reaction to the proteins of the milk of animals, typical of cow, and normally appears in infants but is generally over by the school age. Said symptoms are avoided by providing low lactose or lactose-free milk products for lactose intolerant persons and protein-modified products for infants, like infant formulations. For adults, lactose intolerancy is the main reason to avoid milk products.

The symptoms of lactose intolerance and those of milk protein hypersensitivity can vary individually but are greatly similar to each other. The principal symptoms are gastrointestinal, including flatulence, rumbling, bloating, abdominal pain etc. For example Hughes et al. have shown that undigested proteins in colon causes gas formation by deamination and fermentation (Hughes, R., Magee, E. A. M., Bingham, S., Protein degradation in the large intestine, Curr. Issues Intest. Microbiol. 1(2) (2000): 51:58).

JP 2002-000291 discloses a method for producing a milk protein hydrolyzate having a low lactose content where milk protein raw material is treated with lactase and proteolytic enzyme. A milk sugar decomposition product having low lactose content is recovered by nanofiltration. Lactose hydrolysis and proteolysis can be accomplished either simultaneously or one after the other in a desired order, nanofiltration being performed in each case after the lactose hydrolysis. The milk protein hydrolyzate is reported to be suitable for lactose intolerant and food allergic persons.

US 2002/0192333 A1 discloses acid coagulation-resistant milk that is treated with protease to enhance calcium bioavailability of milk in an animal. Appearance and taste of the protease-treated milk remain unchanged.

US 2005/0244542 A1 discloses acid coagulation-resistant milk having increased absorbability of calcium with the unchanged organoleptic properties. Milk is first heated to a temperature of about 40° C. and 90° C. and then treated with protease enzyme.

Low lactose or lactose-free milk products have already been available in the market for many years. However, it has been proved that milk products having very low lactose content of less than 0.01% are not suitable for all lactose intolerant persons but still cause gastrointestinal problems to some consumers. Thus, there is still a need for milk products where the typical gastrointestinal symptoms caused by milk products are avoided.

BRIEF DESCRIPTION OF THE INVENTION

We have now surprisingly found that the symptoms caused by low lactose milk products can be reduced by modifying the milk proteins of the low lactose milk products with proteolytic enzymes. More particularly, it was surprisingly found that even a low degree of hydrolysis of milk proteins in low lactose milk reduced the severity of stomach symptoms compared to regular lactose free milk.

An aspect of the invention provides a protein hydrolyzed milk product with a low lactose content having a ratio of protein to carbohydrates in the range of 0.5 to 5 by weight. Surprisingly, the milk products of the invention lack the typical flaws in taste of protein hydrolyzed milk products, caused by proteolytic enzymes, but have appearance and organoleptic properties, such as taste and mouth-feel, similar to those of an ordinary milk product.

Another aspect of the invention provides a method for producing a protein hydrolyzed milk product with a low lactose content having a ratio of protein to carbohydrates in the range of 0.5 to 5 by weight, comprising subjecting a milk raw material to lactose removal and protease treatment.

DETAILED DESCRIPTION OF THE INVENTION

Figure 1A:
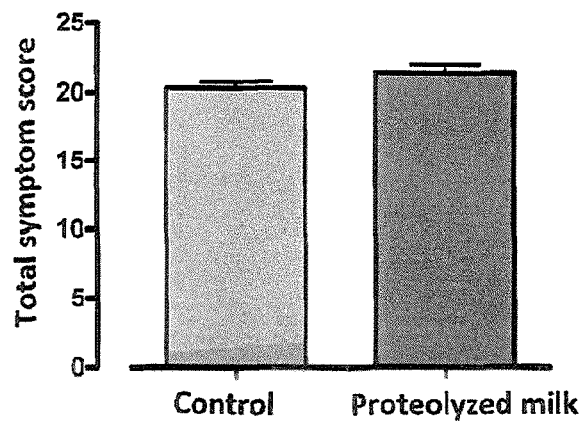
FIG. 1a shows bowel symptoms reported by testees before consumer trial.

As used herein, the term "proteolyzed" and "protein hydrolyzed" are used synonymously.

As used herein, the term "proteolysis" and "protein hydrolysis" are used synonymously.

As used herein, the term "milk raw material" means milk, and combinations of milk and whey as such or as a concentrate or pretreated as a desired manner, such as heat-treated. The milk raw material may be supplemented with ingredients generally used in the preparation of milk products, such as fat, protein, ash (minerals), or sugar fractions, or the like. The milk raw material may thus be, for instance, full-fat milk, cream, low-fat milk or skim milk, ultrafiltered milk, diafiltered milk, microfiltered milk, whey protein depleted milk, recombined milk from milk powder, organic milk or a combination of these, or a dilution of any of these. Milk can originate from a cow, sheep, goat, camel, horse or any other animal producing milk suitable for nourishment. The milk raw material is preferably low-fat or skim milk, more preferably skim milk.

The milk raw material may be heat-treated to enhance denaturation of whey proteins and thus splitting of milk proteins.

As used herein, the term "milk product" means a product of milk origin, comprising casein and whey protein.

As used herein, "low lactose" means a lactose content of less than 1% in the protein hydrolyzed milk product. "Lactose free" means that the lactose content of the milk product is 0.5 g/serving (e.g. for liquid milks 0.5 g/244 g, the lactose content being at most 0.21%), however not more than 0.5%.

An aspect of the invention provides a protein hydrolyzed milk product with a low lactose content having a ratio of protein to carbohydrates in the range of about 0.5 to 5 by weight. Preferably, the ratio is in the range of 0.5 to 3. In an embodiment, the ratio of protein to carbohydrates is about 1. Said ratio of 0.5 to 5 by weight provides a protein hydrolyzed milk product with a low lactose content with good organoleptic properties. More specifically, the milk product of the invention has no watery but a full taste, and structure of ordinary milk product.

In an embodiment, the ratio of protein to ash of the milk product of the invention is in the range of 3 to 9 by weight, preferably 3.5 to 7.5 by weight.

In an embodiment, the ratio of protein:carbohydrates:ash of the milk product of the invention is about 1.12:1:0.26.

Said ratios of protein to ash, and protein:carbohydrates:ash provide a protein hydrolysed milk product of the invention, which has good organoleptic properties and a full taste of normal milk.

Preparations of low lactose and lactose-free milk products are generally known. Several processes have been presented for removing lactose from milk. A conventional enzymatic process for the splitting of lactose is generally known in the field, the process comprising the step of adding lactase from fungus or yeast into milk in such a manner that lactose is split into monosaccharides, i.e. glucose and galactose, in over 80%.

Lactose can also be removed from milk raw material, for example, by using membrane techniques. Four basic membrane filtration processes are generally used: reverse osmosis (RO), nanofiltration (NF), ultrafiltration (UF), and microfiltration (MF). Of these, UF is mainly suitable for separating lactose from milk. Reverse osmosis is generally applied to concentration, ultra- and microfiltration to fractionation, and nanofiltration to both concentration and fractionation. There is a lot of literature relating to lactose removal from milk with various membrane techniques.

Also, a chromatographic separation process is known for lactose removal from milk, for example Harju, M., EP 0226035. In a process known in the art, for example, milk is fractionated in such a manner that the lactose fraction is separated and the salts are in the protein fraction or protein-fat fraction. The process is characterised by balancing cation exchange resin by making its cation composition correspond to that of milk, and milk is chromatographed in a column with the balanced cation exchange resin at a temperature of approximately 50 to 80° C. by using water in elution. An advantage of the process is that all compounds essential to taste remain in the milk.

Further, lactose can be precipitated from milk fractions. There is a lot of literature relating to lactose crystallisation and separation processes.

In the present invention, lactose can be removed from milk in any manner known in the art, such as by membrane techniques using one or more various membrane filtrations including microfiltration, ultrafiltration, nanofiltration, diafiltration and reverse osmosis, by lactose hydrolysis, chromatography, precipitation, or any combination of these in one or more phases. Any lactase enzyme for lactose hydrolysis known in the art can be used in the present invention. In an embodiment of the invention, lactose is removed by membrane techniques.

In an embodiment, the lactose content of the milk product of the invention is less than 1% by weight, preferably less than 0.1% by weight, more preferably less than 0.01% by weight.

In the invention, protein hydrolysis of milk can be accomplished in any manner known in the art. Any suitable protease enzyme can be used in the hydrolysis. Enzymatic splitting of protein is generally known in the field, the process comprising a step of adding protease enzyme or mixtures thereof from generally known enzyme sources i.e. plants and microorganisms, into milk in such a manner that protein is split into peptides and amino acids.

The degree of protein hydrolysis of the protein hydrolyzed milk product with low lactose content is about 60 mg to 500 mg tyrosine per liter of the protein hydrolyzed milk having protein content of about 3.5% (w/w). Said tyrosine range equals a low degree of proteolysis.

In accordance with the invention, the protein hydrolyzed milk product with low lactose content has soluble tyrosine content of up to 500 mg/liter of the product having protein content of about 3.5% (w/w). In further embodiments, the soluble tyrosine per liter is 70 mg, 80 mg, 90 mg, 100 mg, 110 mg, 120 mg, 130 mg, 140 mg, 150 mg, 160 mg, 170 mg, 180 mg, 200 mg, 220 mg, 240 mg, 260 mg, 280 mg, 300 mg, 320 mg, 340 mg, 360 mg, 380 mg, 400 mg, 420 mg, 440 mg, 460 mg, 480 mg and 500 mg.

Another aspect of the invention provides a method for producing a protein hydrolyzed milk product with a low lactose content having a ratio of protein to carbohydrates in the range of about 0.5 to 5 by weight, comprising subjecting a milk raw material to lactose removal and protease treatment.

The lactose removal and protease treatment can be performed simultaneously, or one after the other, i.e. the lactose removal is accomplished prior to, during or subsequent to the protease treatment. In an embodiment, the lactose removal is performed prior to the protease treatment.

In an embodiment of the invention, lactose is removed from the milk raw material by means of a lactase enzyme treatment.

Another embodiment of the method of the invention comprises the steps of:

a) subjecting the milk raw material to one or more membrane filtrations to produce a low lactose milk product, b) if desired, hydrolyzing the low lactose milk product by lactase to produce a lactose-free milk product, c) subjecting the low lactose milk product or the lactose-free milk product to a protease treatment to produce a protein hydrolyzed milk product with a low lactose content.

In an embodiment of the invention, residual lactose in the low lactose milk product is hydrolyzed in step b) into monosaccharides as is well known in the field. This can be performed with commercially available lactase enzymes in a manner known per se. In an embodiment, the lactase and protease treatments of steps b) and c), respectively, are carried out simult-aneously.

In another embodiment of the invention, the low lactose milk product is produced by the steps of:

a) subjecting the milk raw material to ultrafiltration to produce an ultrafiltration retentate and a ultrafiltration permeate, b) subjecting the ultrafiltration permeate to nanofiltration to produce a nanonifiltration permeate and a nanofiltration retentate, c) returning the NF permeate to the UF retentate to produce a low lactose milk product.

In a further embodiment, the low lactose milk product is produced by the steps of:

a) subjecting the milk raw material to ultrafiltration to produce an ultrafiltration retentate and a ultrafiltration permeate, b) subjecting the ultrafiltration permeate to nanofiltration to produce a nanonifiltration permeate and a nanofiltration retentate, c) concentrating the NF permeate by reverse osmosis (RO) to produce a RO retentate and a RO permeate, d) returning the RO retentate to the UF retentate to produce a low lactose milk product.

In a still further embodiment, the milk raw material is subjected to microfiltration to produce a low lactose milk product as a microfiltration retentate. In microfiltration, whey proteins including mainly β-lactoglobulin and α-lactalbumin are concentrated into a microfiltration permeate and casein into a microfiltration retentate. Microfiltration thus enables to modify the proportions of β-lactoglobulin and α-lactalbumin in the milk raw material to a desired extent, and to adjust the total whey protein content in the milk product. Microfiltration can be performed at an elevated temperature, such as at about 50° C., or at a reduced temperature, like at about 10° C. In diafiltration of microfiltration, it is possible to use tap water or fractions from different membrane processes of milk, such as NF permeate, UF permeate, RO retentate, chromatographically separated fraction or a combination of these, or a dilution of any of these. Diafiltration medium (diawater) can also originate from separate processes.

The processes of the invention enable that all the natural ingredients present in milk except for lactose can be retained or returned to the milk product. Thus, the appearance and organoleptic properties, such as taste and mouth-feel, of the milk product remain similar to those of ordinary milk product.

The milk product of the invention can be supplemented by other ingredients, like milk or various natural components of milk such as milk minerals, also water, vitamins, etc. Various milk components can be provided by any suitable separation method like membrane filtrations, chromatography etc. These components can be introduced to the milk product of the invention to provide the milk product with desired fat, protein and lactose contents. The supplementary ingredients can be introduced to the final proteolyzed milk product of the invention, or at one or more stages of the methods for producing the product of the invention.

In an embodiment of the invention, the milk raw material is subjected to a heat treatment, for example at a temperature range of 65° C. to 95° C., for 15 seconds to 10 minutes prior to lactose removal to denaturate at least part of the whey proteins and selectively separate the whey proteins. Preferably, whey protein separation is accomplished by membrane techniques, more preferably by microfiltration.

In an embodiment of the invention, the protein hydrolyzed milk product is subjected to a protease inactivation treatment. Inactivation conditions depend on the enzyme used in the method. For example, heating at 85° C. for 1 minute is sufficient to inactivate most of the enzymes.

The inactivation treatment can be carried out at any suitable stage of the preparation process of the product. For example, the inactivation treatment can be accomplished simultaneously with a conventional heat treatment conditions generally used for destruction of pathogens in milk. Examples of heat treatments to be used in the invention are pasteurization, high pasteurization, or heating at a temperature lower than the pasteurization temperature for a sufficiently long time. Specifically, UHT treatment (e.g. milk at 138° C., 2 to 4 s), ESL treatment (e.g. milk at 130° C., 1 to 2 s), pasteurization (e.g. milk at 72° C., 15 s), or high pasteurization (95° C., 5 min) can be mentioned. The heat treatment may be either direct (vapour to milk, milk to vapour) or indirect (tube heat exchanger, plate heat exchanger, scraped-surface heat exchanger). Heat treatment of the product must be sufficient to inactivate the protease enzymes to avoid any adverse effects on organoleptic properties.

Test results of FIGS. 1 and 2 surprisingly show that even a low degree of hydrolysis of milk proteins in the milk of the invention lowered the severity of stomach symptoms with sensitive individuals compared to regular lactose free milk. Organoleptic properties such as taste and mouth-feel and appearance of the milk product of the invention are unexpectedly retained excellent, corresponding to those of normal milk products. For example, the products of the invention have no bitter taste typical for protein hydrolyzed milk products, caused by peptides formed in proteolysis.

The protein hydrolyzed milk product having low lactose content of the invention can be used as a raw material in the preparation of all kinds of sour milk products and/or acidified fresh products, typically yoghurt, fermented milk, viili and fermented cream, sour cream, cràme fraiche, quark, butter milk, kefir, dairy shot drinks, other sour milk products, and in the preparation of all kinds of powders.

The method of the invention is suitable for modern component preparation in which milk components having different fat, protein, and lactose contents are combined in a known manner only just before aseptic packaging.

The method of the invention may be applied to both batch and continuous production. Preferably, the process of the invention is performed as a batch process.

The following examples are presented for further illustration of the invention without limiting the invention thereto. Soluble tyrosine of the milk products of the invention was analyzed according to the modified method of Matsubara et al. (Matsubara, H., Hagihara, B., Nakai, M., Komaki, T., Yonetani, T., Okunuki, K., Crystalline bacterial proteinase II. General properties of crystalline proteinase of Bacillus subtilis N', J. Biochem. 45 (4) (1958) 251-258). Analysis was performed for samples which were boiled for 4 min at 100° C., and centrifuged. Soluble tyrosine was determined for the supernatant after centrifugation (3000 rcf (relative centrifucal force), 15 min).

Example 1

30 liters of pasteurized (72° C., 15 s.) milk having a fat content of 1.5% were ultrafiltered at 50° C. with a laboratory scale Labstak ultrafilter at a concentration ratio of 1.5 using GR61 PP membranes having a cut off value of 20.000 Da. Both the obtained UF retentate (20 L) and the obtained UF permeate (10 L) were recovered.

The UF permeate including mainly lactose (10 L) was further nanofiltered at the room temperature by concentration coefficient 4 through Millipore Nanomax-50 nanofiltration membranes, whereby lactose was retained in a NF retentate (2.5 L) and univalent ions passed through the membrane (NaCl retention <65%) and collected into a NF permeate (7.5 L). The nanofiltration retentate is suitable for further use as a low mineral lactose fraction.

The nanofiltration permeate (7.5 L) was concentrated at the room temperature using reverse osmosis membranes Nanomax-95 (Millipore) by concentration coefficient 10, whereby the minerals contained in the nanofiltration permeate were concentrated into a reverse osmosis (RO) retentate (NaCl retention >94%). The RO retentate is usable in the production of lactose-free milk in terms of the restoration of minerals or supplementing/completion mineral composition.

692 g of the UF retentate and 105 g of the RO retentate, produced above, and 203 g of water were mixed. 4 g of HA lactase (Chr. Hansen A/S, Denmark) and 4.7 mg of Alcalase 2.4 L FG protease (Novozymes Inc., Denmark) together with 0.81 mg of Flavourzyme 1000 L (Novozymes Inc., Denmark) were added to the mixture. The mixture was allowed to hydrolyze at 6° C. for 24 hours, during which time the lactose content drops below 0.01 and the soluble tyrosine content of the mixture is increased to 150 mg/L milk.

Table 1 shows the compositions of the UF retentate and the RO retentate produced as described above. The composition and organoleptic properties of the proteolyzed milk product is similar to that of ordinary semi-skimmed milk and tastes like semi-skimmed milk, except that the proteolyzed milk product is completely lactose-free (lactose <0.01%) and the soluble tyrosine content thereof is increased (150 mg/L). The ratio of protein:carbohydrates:ash in the milk product of the invention was 3.35:3.0:0.79, i.e. 1.12:1:0.26.

TABLE 1

Production of proteolyzed lactose-free milk (non-fat total solids, NFTS, about 7.3 wt %)

| Component | UF retentate k = 1.5 | RO retentate | Proteolyzed lactose-free milk of the invention | Semi-Skimmed milk |
|---|---|---|---|---|
| Total protein, % | 4.79 | 0.34 | 3.35 | 3.3 |
| Lactose, % | 4.37 | 0.15 | <0.01 | 4.64 |
| Glucose + galactose, % | n.m. | n.m. | 3.0 | n.m. |
| Fat, % | 2.22 | 0 | 1.5 | 1.5 |
| Ash, % | 0.91 | 1.52 | 0.79 | 0.79 |
| Dry matter, % | 12.49 | 1.90 | 8.84 | 10.39 |

(n.m. = not measured)

The proteolyzed milk product obtained was heat-treated (125° C., 4 s) and packaged aseptically in order to assure shelf-life and inactivate enzymes. The proteolyzed milk product was cooled to 6° C. The organoleptic properties were excellent.

Example 2

Skimmed milk was processed as described in Example 1 except that skimmed milk was ultrafiltered at a concentration ratio of 3.7, and a UF permeate was further nanofiltered by a concentration coefficient of 4.266 g of the UF retentate and 369 g of the NF permeate obtained, and 364 g of skimmed milk were mixed. The lactase and protease enzyme treatments were performed in a similar manner as described in Example 1. The composition and organoleptic properties of the proteolyzed milk product having a content of non-fat total solids of about 8.4 wt % were similar to those of the product obtained in Example 1. The soluble tyrosine content is increased (148 mg/L).

TABLE 2

Production of proteolyzed lactose-free milk (NFTS > 8.25 wt %) from skimmed milk (36.4%), UF retentate (26.6%) and NF permeate (36.9%)

| Component | UF retentate k = 3.7 | NF permeate | Skimmed milk | Proteolyzed lactose-free milk of the invention |
|---|---|---|---|---|
| Total protein, % | 12.5 | 0 | 3.5 | 4.6 |
| Lactose, % | 5.1 | 0.14 | 4.6 | <0.01 |
| Glucose + galactose, % | n.m. | n.m. | n.m. | 3.1 |
| Fat, % | 0.2 | 0 | 0.05 | 0.07 |
| Ash, % | 1.6 | 0.24 | 0.77 | 0.78 |
| Dry matter, % | 18.5 | 0.3 | 9.6 | 8.5 |

(n.m. = not measured)

Example 3

Skimmed milk was processed as described in Example 1 except that the protease treatment at 6° C. was performed after the lactase treatment. The composition and organoleptic properties of the proteolyzed milk product were similar to those of the product obtained in Example 1.

Example 4

Skimmed milk was processed as described in Example 1 except that the protease treatment at 6° C. was performed prior to the lactase treatment. The composition and organoleptic properties of the proteolyzed milk product were similar to those of the product obtained in Example 1.

Example 5

The temperature of standardized milk (10 kg) having a fat content of 1.5% was adjusted to 6° C. 0.8 g of HA lactase (Chr. Hansen A/S, Denmark) and 47 mg of Alcalase 2.4 L FG protease (Novozymes Inc., Denmark) together with 8.1 mg of Flavourzyme 1000 L (Novozymes Inc., Denmark) were added to the standardized milk. The mixture obtained was allowed to hydrolyze at 6° C. for 24 hours. The proteolyzed milk product was then heat-treated as described in Example 1. The proteolyzed milk product is similar to ordinary semi-skimmed low lactose milk and tastes like low lactose milk, but is slightly sweeter as compared to ordinary milk. The soluble tyrosine content is increased (147 mg/L).

Example 6

Skimmed milk was microfiltrated at a filtration temperature of 50° C. using 0.1 μm membrane (Synder FR, Synder Filtration, USA) by a concentration factor of 3 times by volume. The major part of whey proteins was removed to a microfiltration permeate. The MF retentate produced in the microfiltration was diafiltrated using a milk UF permeate (DSS GR61 PP, Alfa Laval AS, Denmark) by feeding the ultrafiltration permeate to the MF retentate at the same rate at which the MF permeate was removed from the diafiltration. The amount of the UF permeate was equal to the amount of the skimmed milk at feed. With the amount of the UF permeate used in diafiltration it is possible to regulate the whey protein content of the final MF retentate. After the diafiltration step, the ultrafiltration permeate was added to the milk concentrate obtained as a MF retentate to adjust the protein content of the milk concentrate so as to correspond to that of original milk. In other words, the milk was diluted so as to correspond to the original protein content of the original milk. With the microfiltration system, 78% of the β-lactoglobulin of the milk was removed.

The milk product, i.e. MF retentate standardized with UF permeate (Table 3), was lactase and protease treated and heat-treated as in Example 1.

TABLE 3

Production of milk having low content of whey proteins (MF retentate standardized with UF-permeate) using microfiltration

| Component | Skimmed milk (MF feed) | Milk (MF retentate standardized with UF permeate) | Milk (UF permeate) |
|---|---|---|---|
| Total protein, % | 3.4 | 3.5 | 0.24 |
| Lactose, % | 4.7 | 4.3 | 4.8 |
| Fat, % | 0.1 | 0.1 | 0.02 |
| Ash, % | 0.75 | 0.77 | 0.49 |
| Dry matter, % | 9.1 | 9.0 | 5.8 |
| β-lactoglobulin, g/L | 3.2 | 0.7 | n.m. |
| α-lactalbumin, g/L | 1.2 | 0.37 | n.m. |

(n.m. = not measured)

The composition and organoleptic properties of the proteolyzed milk product of the invention were close to ordinary skimmed milk. The proteolyzed milk product tastes like skimmed milk but is completely lactose-free (lactose <0.01%), has an increased content of soluble tyrosine (>150 mg/L) and a low content of whey protein (the ratio of α-lactalbumin to 6-lactoglobulin <1).

Example 7

Skimmed milk was processed as described in Example 6 except that skimmed milk was microfiltrated at a filtration temperature of 10° C. by a concentration factor of 3.3 times by volume, and produced MF retentate was diafiltrated using hydrolyzed 3% UF permeate of milk. After the diafiltration step, the hydrolyzed ultrafiltration permeate of the milk and milk minerals were added to the milk concentrate obtained as the MF retentate to adjust the protein content of the milk concentrate so as to correspond to that of the original milk. The milk product, i.e. MF retentate standardized with hydrolyzed UF permeate and milk minerals (Table 4), was enzyme treated and heat-treated as in Example 1.

TABLE 4

Production of milk having low content of whey protein (MF retentate standardized with UF-permeate) using microfiltration

| Component | Skimmed milk (MF feed) | Milk (MF retentate standardized with hydrolyzed UF permeate and milk minerals) | Hydrolyzed milk (UF permeate) |
|---|---|---|---|
| Total protein, % | 3.4 | 3.5 | 0.24 |
| Lactose, % | 4.7 | 0.1 | 0.01 |

TABLE 4-continued

Production of milk having low content of whey protein (MF retentate standardized with UF-permeate) using microfiltration

| Component | Skimmed milk (MF feed) | Milk (MF retentate standardized with hydrolyzed UF permeate and milk minerals) | Hydrolyzed milk (UF permeate) |
|---|---|---|---|
| Glucose + galactose, % | n.m. | 3.5 | 4.7 |
| Fat, % | 0.1 | 0.1 | 0.02 |
| Ash, % | 0.75 | 0.8 | 0.49 |
| Dry matter, % | 9.1 | 8.5 | 5.8 |
| β-lactoglobulin, g/L | 3.2 | 0.4 | n.m |
| α-lactalbumin, g/L | 1.2 | 0.15 | n.m |

(n.m. = not measured)

The composition and organoleptic properties of the proteolyzed milk product of the invention were close to ordinary skimmed milk. The proteolyzed milk product tastes like slightly sweet skimmed milk and has an increased content of soluble tyrosine (>150 mg/L) and a low content of whey protein (the ratio of α-lactalbumin to β-lactoglobulin <1).

Example 8

Proteolyzed milk product of the invention produced in Example 1 was used in consumer trial, where the proteolyzed milk product of the invention was compared to the lactose-free semi-skimmed milk (control). Total number of participants (N) was 90, of which 48 subjects (consumers) in proteolyzed milk group (lactose <0.01% and the soluble tyrosine content >150 mg/L) and 42 subjects (consumers) in control milk group (lactose <0.01%). All subjects used the milk product daily at least 2 dL during 10 d trial (blinded test). The symptoms were followed and reported by symptom diary. The intensity of each symptom, flatulence, bloating, abdominal pain and rumbling was measured on a scale of '0' (absence of symptoms) to '7' (severe symptoms).

Figure 1B:
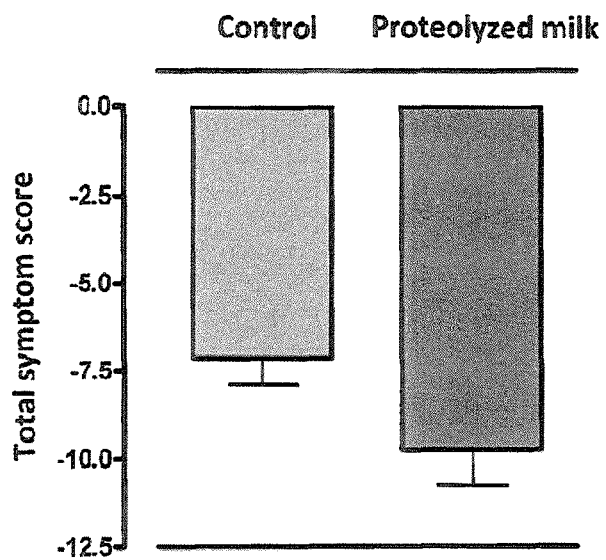
FIG. 1b shows the change in bowel symptoms after 10 d trial (p=0.039).
Figure 2A:
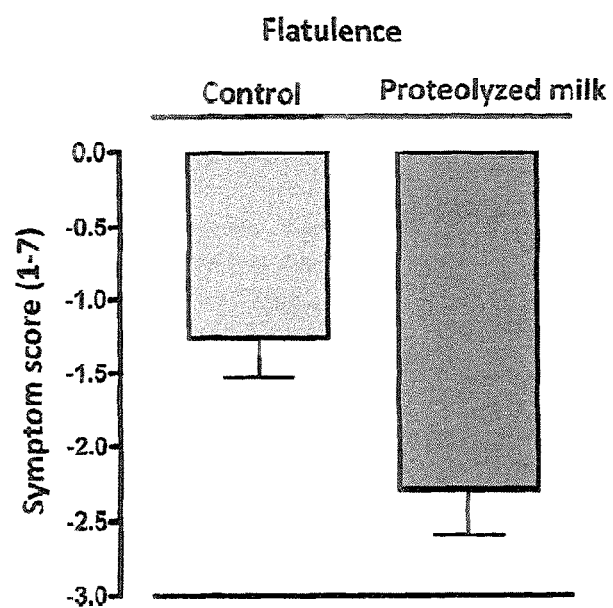
FIG. 2a shows the change in symptom score (1-7) in flatulence (p=0.014).
Figure 2B:
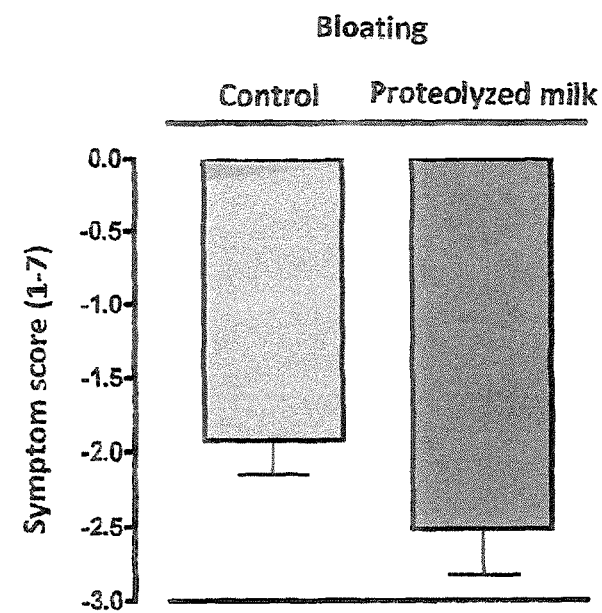
FIG. 2b shows the change in symptom score (1-7) in bloating (p=0.076).
Figure 2C:
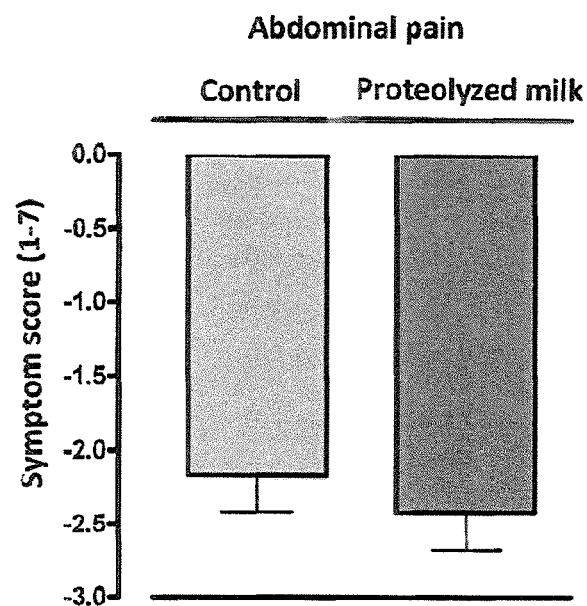
FIG. 2c shows the change in symptom score (1-7) in abdominal pain (p=0.47).
Figure 2D:
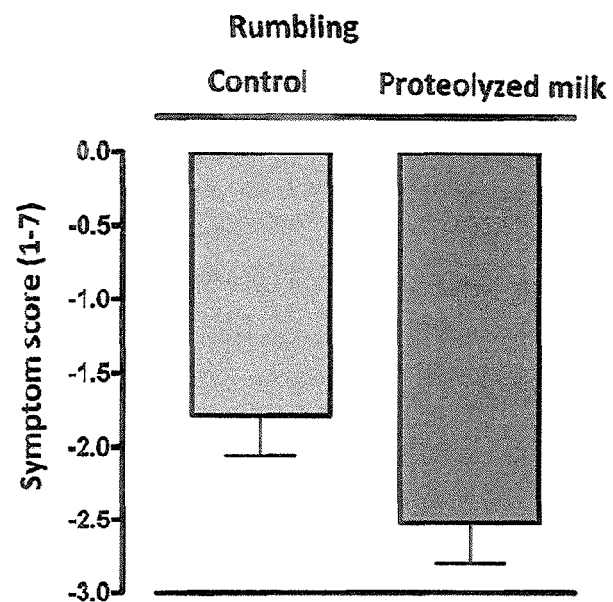
FIG. 2d shows the change in symptom score (1-7) in rumbling (p=0.039).

As shown in FIG. 1b, the change in abdominal adverse effects (total symptom score) was higher in proteolyzed milk group than in control group (p=0.039). The change in the intensity of each symptom is shown in FIGS. 2a to 2d. The proteolyzed milk product of invention significantly decreased flatulence (p=0.014) (FIG. 2a) and rumbling (p=0.039) (FIG. 2d). Also less bloating (p=0.076) (FIG. 2b) and abdominal pain (p=0.47) (FIG. 2c) were observed.

The invention claimed is:

1. A protein hydrolyzed milk product with a low lactose content having a ratio of protein to carbohydrates in the range of about 0.5 to 5 by weight, a ratio of protein to ash in the range of 3 to 9 by weight, and a lactose content of less than 1% by weight, wherein the degree of protein hydrolysis is 1.7 mg to 14.3 mg soluble tyrosine/g protein in the protein hydrolyzed milk product, wherein the protein hydrolyzed milk product has appearance and organoleptic properties of normal milk.

2. The protein hydrolyzed milk product of claim 1, wherein the ratio of protein to carbohydrates is about 1.

3. The protein hydrolyzed milk product of claim 1, wherein the ratio of protein:carbohydrates:ash is about 1.12:1:0.26.

4. The protein hydrolyzed milk product of claim 1, wherein the ratio of protein to carbohydrates is in the range of about 0.5 to 3.

5. The protein hydrolyzed milk product of claim 1, wherein the ratio of protein to ash is in the range of 3.5 to 7.5 by weight.

6. The protein hydrolyzed milk product of claim 1, wherein the lactose content is less than 0.1% by weight.

7. The protein hydrolyzed milk product of claim 1, wherein the lactose content is less than less than 0.01% by weight.

8. The protein hydrolyzed milk product of claim 1, wherein the soluble tyrosine per liter is 130 mg to 170 mg.

9. The protein hydrolyzed milk product of claim 1, wherein a ratio of protein:carbohydrates:ash is in a range of 0.81:1:0.18 to 1.48:1:0.25.

10. The protein hydrolyzed milk product of claim 1, wherein a ratio of protein:carbohydrates:ash is 0.97:1:0.22.

11. A method for producing a protein hydrolyzed milk product with a low lactose content having a ratio of protein to carbohydrates in the range of about 0.5 to 5 by weight, a ratio of protein to ash in the range of 3 to 9 by weight, and a lactose content of less than 1% by weight, wherein the degree of protein hydrolysis is 1.7 mg to 14.3 mg soluble tyrosine/g protein in the protein hydrolyzed milk product, comprising subjecting a milk raw material to lactose removal and protease treatment, wherein the protein hydrolyzed milk product has appearance and organoleptic properties of normal milk.

12. The method of claim 11, wherein the lactose removal is accomplished prior to, during or subsequent to the protease treatment.

13. The method of claim 11, wherein the lactose removal is accomplished by means of membrane techniques, lactose hydrolysis, chromatography, precipitation or any combination of these.

14. The method of claim 13, wherein the milk raw material is subjected to a lactase enzyme treatment.

15. The method of claim 13, wherein
a) the milk raw material is subjected to one or more membrane filtrations to produce a low lactose milk product,
b) if desired, the low lactose milk product is hydrolyzed by lactase to produce a lactose-free milk product,
c) subjecting the low lactose milk product or the lactose-free milk product to a protease treatment to produce a protein hydrolyzed milk product with a low lactose content.

16. The method of claim 15, wherein
a) the milk raw material is subjected to ultrafiltration (UF) to produce an ultrafiltration retentate and a ultrafiltration permeate,
b) the ultrafiltration permeate is subjected to nanofiltration (NF) to produce a nanofiltration permeate and a nanofiltration retentate,
c) the NF permeate is returned to the UF retentate to produce a low lactose milk product.

17. The method of claim 16, wherein milk minerals are added.

18. The method of claim 15, wherein
a) the milk raw material is subjected to ultrafiltration (UF) to produce an ultrafiltration retentate and a ultrafiltration permeate,
b) the ultrafiltration permeate is subjected to nanofiltration (NF) to produce a nanofiltration permeate and a nanofiltration retentate,
c) the NF permeate is concentrated by reverse osmosis (RO) to produce a RO retentate and a RO permeate,
d) the RO retentate is returned to the UF retentate to produce a low lactose milk product.

19. The method of claim 18, wherein water and milk minerals are added.

20. The method of claim 15, wherein the milk raw material is subjected to microfiltration (MF) to produce a low lactose milk product as a microfiltration retentate.

21. The method of claim 20, wherein milk minerals are added to the MF retentate.

22. The method of claim 15, wherein steps b) and c) are accomplished simultaneously.

23. The method of claim 11, wherein the milk raw material is heat-treated prior to lactose removal and/or protease treatment.

24. The method of claim 11, wherein the protein hydrolyzed milk product is subjected to a protease inactivation treatment.

25. The method of claim 12, wherein the lactose removal is accomplished prior to the protease treatment.

26. The method of claim 13, wherein the lactose removal is accomplished by means of membrane techniques.

27. The method of claim 17, wherein milk minerals are added to the protein hydrolyzed milk product or the UF retentate.

28. The method of claim 19, wherein water and milk minerals are added to the protein hydrolyzed milk product or the UF retentate.

29. The method of claim 11, wherein the soluble tyrosine per liter is 130 mg to 170 mg.

\* \* \* \* \*